(No Model.) 2 Sheets—Sheet 1.
E. DEVONSHIRE.
APPARATUS FOR PURIFYING WATER.
No. 458,887. Patented Sept. 1, 1891.
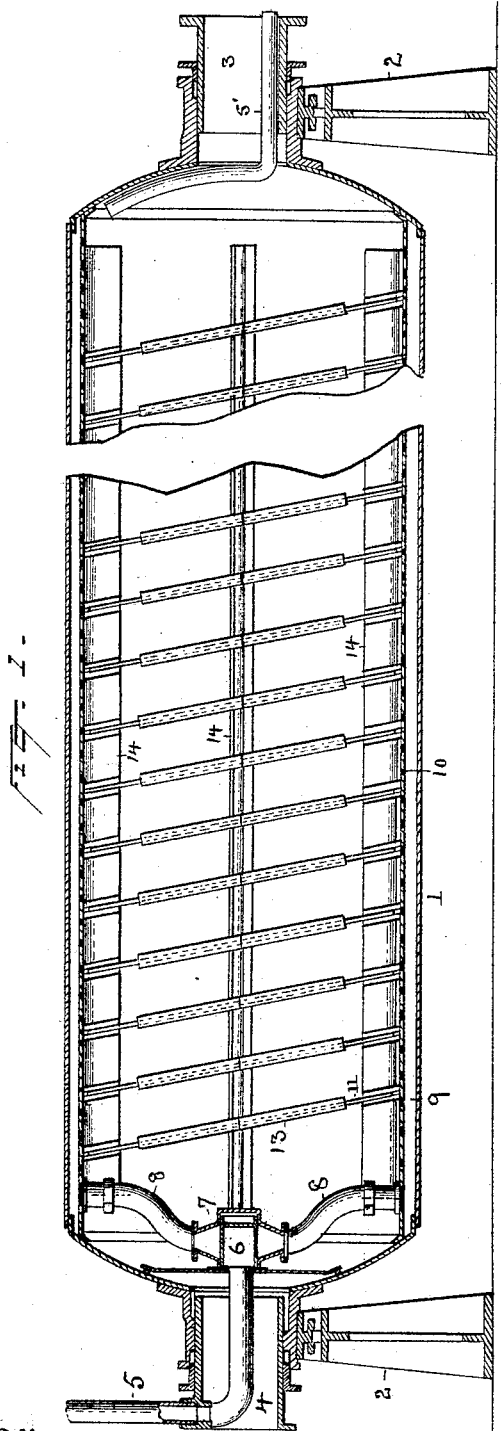
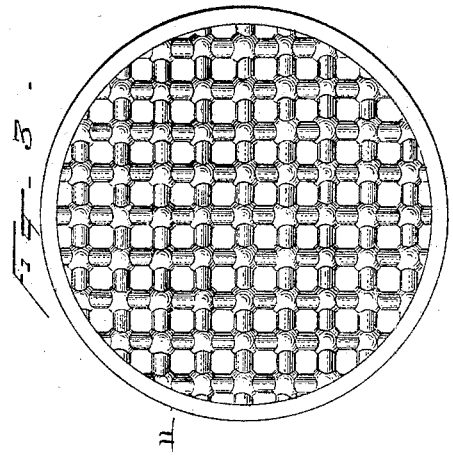
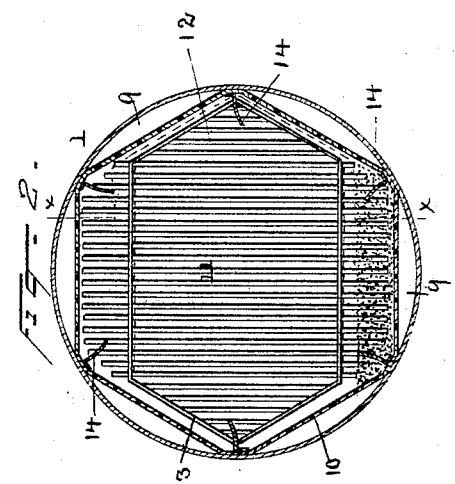
Witnesses
Norris A. Clark.
W. Klyce
Inventor
E. Devonshire
By his Attorneys
Dyer & Seely.

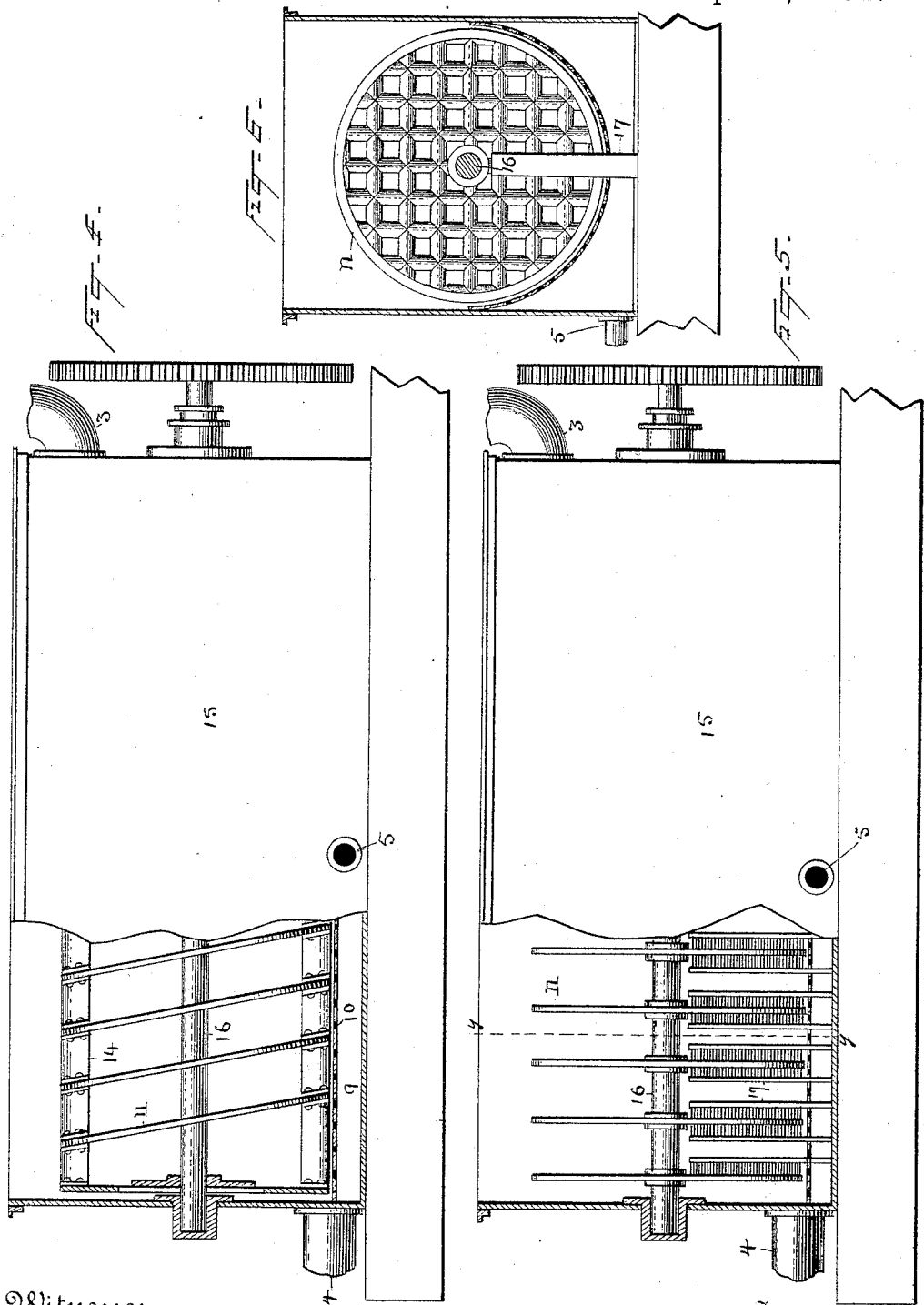

UNITED STATES PATENT OFFICE.

EASTON DEVONSHIRE, OF LONDON, ENGLAND, ASSIGNOR TO THE REVOLVING PURIFIER COMPANY, LIMITED, OF SAME PLACE.

APPARATUS FOR PURIFYING WATER.

SPECIFICATION forming part of Letters Patent No. 458,887, dated September 1, 1891.

Application filed October 7, 1890. Serial No. 367,373. (No model.)

*To all whom it may concern:*

Be it known that I, EASTON DEVONSHIRE, a subject of the Queen of Great Britain, residing at London, county of Middlesex, England, have invented a certain new and useful Improvement in Water-Purifying Apparatus, of which the following is a specification.

My invention relates to apparatus for purifying water by bringing it into intimate contact with iron or other chemically-acting material, and an apparatus for simultaneously bringing the water in contact with the iron or other material and aerating the water, as hereinafter fully set forth, and especially for producing uniform contact between all the water and the chemical-purifying material and air or gas.

The invention consists in a vessel, chamber, or tank having a water inlet and outlet and grids or open-work partitions at intervals in the chamber, with means for polishing them.

The invention also consists in a chamber or vessel with water inlet and outlet, an inlet and outlet for air or gas, and said grids or open-work partitions.

The invention also consists in other features of construction and combinations which will be specifically set forth in the several clauses of the claim at the end of the specification.

In the accompanying drawings, which illustrate my invention, Figure 1 is a longitudinal section of one form of purifier embodying the invention on line *x x* of Fig. 2. Fig. 2 is a cross-section of the purifier, showing one form of grid which I may employ. Fig. 3 is a view of a modified form of grid. Fig. 4 shows a modified form of purifier; and Figs. 5 and 6 illustrate a second modification, Fig. 6 being a section on line *y y* of Fig. 5.

In Fig. 1 is shown a cylinder or drum 1, mounted on suitable standards 2 and adapted to be revolved by any suitable means. The hollow trunnion 3 constitutes an inlet for the water to be purified, while a like trunnion 4 at the other end of the cylinder constitutes the water-outlet. 5 is a pipe leading from an air-blower or any suitable source of air-supply or from a supply of carbonic-acid or other gas and terminates in a box 6, having an opening on its lower side, as shown. 7 is a box or casing surrounding box 6 and having several pipes 8, preferably six, radiating therefrom. 5' is an outlet for the air which accumulates at the drum. It will be understood that the pipes which constitute the water and air inlets and outlets are stationary while the drum turns thereon. The outer end of the radiating pipes communicates with passages 9, which preferably extend the whole length of the drum, and are formed by perforated partitions which subtend arcs of the drum around the inner periphery, as clearly shown in Fig. 2, 10 being the perforated partitions. Within the drum are placed the grids or open-work partitions 11. These may be made in any convenient shape or by any convenient method.

The form illustrated in Fig. 2 is composed of wrought-iron bars 12, held in a suitable frame 13, while the form illustrated in Fig. 3 is supposed to be an iron casting composed of bars or ribs at an angle to each other, with enlargements at the points of intersection, as shown. In the form of apparatus now being described these grids are placed at an angle to the axis of the drum. The angle of the grids is preferably one in five, and their distance apart is such that a vertical line from the top of one passes through the bottom of the next one, although it will be clear that the angle and location may be varied without departing from the invention.

Between the grids I place straight or curved shelves or scoops 14, and when the apparatus is to be used I place within the drum a small quantity of solid particles—such as sand, gravel, or iron punching or scrap—as indicated in Fig. 2, to serve as polishing material for the grids.

In the apparatus illustrated in Fig. 4 a stationary tank 15 is employed instead of the revolving drum heretofore described. The water inlet and outlet are numbered, as in Fig. 1, as also are the grids and the shelves or scoops. 5 is a pipe leading from an air or gas supply to the space 9 under the perforated partition 10, on which fall the particles of gravel, iron, or other material during rotation of the apparatus. The grids are supported on a central shaft 16 and are rotated thereby. The shelves are placed between the grids and are bolted or otherwise connected thereto, the whole forming a rigid revolving framework.

In Fig. 5 is also shown a stationary tank having water inlet 3 and outlet 4, and air or gas inlet 5. On the shaft 16 are placed a suitable number of grids of the character already described; but in this case they are shown as being placed at right angles to the shaft, and instead of solid particles and means for raising and showering the same over the grids the polishing material is in the form of metal brushes 17, which bear against the sides of the grids, as shown, which, as the latter revolve, polish them. In some cases one brush for each grid may be sufficient. Such an arrangement is shown at the left in Fig. 5.

The operation of the apparatus is as follows: Referring first to Fig. 1, the drum is revolved by any suitable means, and water and air or gas under suitable head or pressure are admitted at their respective inlets, the water passing through the openings in the several grids and out at the opposite end of the drum. The air or gas passes to the lower passage and rises through the perforated partition 10 and through the openings in the grids in an opposite direction from that in which the water is passing to the space above the water, and through pipe 5' to the pipe or tank, through which water is introduced into the purifier, and may there escape to the open air. At the same time the solid particles in the drum are raised by the scoops 14 and are showered down from the upper side of the drum against the inclined grids. It will be seen that these particles will fall first against one side and then against the opposite side of the grids, and by the force of impact will keep both surfaces bright and in the best possible condition for chemical action. Some of the particles also will fall in such manner as to pass through the openings in the grids, and will thus keep the surfaces of the iron around the openings in the grid bright. When the solid particles are of iron, both said particles and the material of the grids are relied on to furnish the chemical agent for purifying the water, and both will simultaneously be kept bright. When, however, the solid particles are gravel or other inert substance, the chemical action is due wholly to the material of the grids, and the particles are merely used to keep the same bright and polished.

In using the apparatus shown in Fig. 4, instead of rotating the vessel which contains the water the frame composed of the grids and the scoops is revolved. This raises the solid particles and showers them down in substantially the same manner as already described in connection with Fig. 1 and with the same result.

In using the apparatus illustrated in Fig. 5 the solid particles are omitted and the grids are polished by means of metal or other suitable brushes bearing on one or both sides. In this case the chemical action is due to the grids or to the grids and brushes.

It will be evident that many other modifications might be illustrated, all involving the same general principles as those already described; but this is not deemed necessary. It will be evident, also, that while it is especially desirable to treat the water with iron or other chemically-acting material and air or gas at the same time, certain features of my improvement may be used separately. For example, in the apparatus illustrated in Fig. 1 the means for introducing air or gas might be omitted and still the apparatus would be capable of use, although it would not be as efficient with certain classes of water. After passing the water to be purified through an apparatus of the character described it is preferably taken to a settling-tank, and then passed through a sand or other filter in the manner described by William Anderson in his application, Serial No. 342,135, dated February 28, 1890.

Having thus described my invention, what I claim is—

1. In a water-purifier, the combination of a chamber or tank containing polishing material, means for passing water through the same, grids or open-work partitions of chemically-acting material in the vessel, and means for moving the grids and polishing material relatively to each other, substantially as described.

2. In a water-purifier, the combination of a chamber or tank containing polishing material, means for passing water through the same, grids or open-work partitions of chemically-acting material in the chamber, and means for revolving the grids, substantially as described.

3. In a water-purifier, the combination of a chamber or tank containing polishing material, means for passing water through the same, grids or open-work partitions of chemically-acting material in the chamber, means for revolving the grids, and means for passing air or gas through the chamber, substantially as described.

4. In a water-purifier, the combination of a chamber or tank containing solid particles, means for passing water through the chamber, grids or open-work partitions in the vessel, and means for continuously or repeatedly showering the solid particles against the partitions to polish the same, substantially as described.

5. In a water-purifier, the combination of a chamber or tank containing iron particles, means for passing water through the chamber, grids or open-work partitions in the chamber, and means for repeatedly showering said particles against the partitions to polish the same, substantially as described.

6. In a water-purifier, the combination of a chamber or tank containing polishing material, means for simultaneously passing air or gas and water therethrough, grids or open-work partitions of chemically-acting material in the chamber, and means for moving the grids and polishing material relatively to each other, substantially as described.

7. In a water-purifier, the combination of a chamber or tank containing solid particles, means for passing water through the chamber, grids or open-work partitions in the chamber, and means for repeatedly showering the particles against the partitions to polish the same, and an air or gas inlet and outlet, substantially as described.

8. In a water-purifier, the combination of a revolving chamber containing solid particles and having a water inlet and an outlet, inclined grids in the chamber, and shelves or scoops between the grids, whereby when the chamber is turned the solid particles are raised and showered down against the grids, substantially as described.

9. In a water-purifier, the combination of a revolving chamber containing solid particles and having air or gas and water inlets and outlets, inclined grids in the chamber, and shelves or scoops between the grids, substantially as described.

10. In a water-purifier, the combination of a revolving chamber containing polishing material, having a water-inlet and water-outlet, an air or gas inlet communicating with air-passages through the chamber, an air-outlet, and grids in the chamber, substantially as described.

11. In a water-purifier, the combination of a revolving chamber having a water-inlet at one end and an outlet at the opposite end, passages around the inner periphery of the chamber, an inlet communicating with the lower passage, an outlet, and iron or similar grids in the chamber, substantially as described.

12. In a water-purifier, the combination of a revolving chamber containing polishing material, having a water-inlet at one end and an outlet at the opposite end, passages around the inner periphery of the chamber, an inlet communicating with the lower passage, an outlet, and inclined iron or similar grids in the chamber, and means for moving the polishing materials and grids relatively to each other, substantially as described.

This specification signed and witnessed this 12th of September, 1890.

EASTON DEVONSHIRE.

Witnesses:
CHARLES M. CATLIN,
D. H. DRISCOLL.